US009038610B2

(12) United States Patent
Meshenky et al.

(10) Patent No.: US 9,038,610 B2
(45) Date of Patent: May 26, 2015

(54) CHARGE AIR COOLER, AND INTAKE MANIFOLD INCLUDING THE SAME

(71) Applicant: Modine Manufacturing Company, Racine, WI (US)

(72) Inventors: Steven P. Meshenky, Racine, WI (US); Jason J. Braun, Mt. Pleasant, WI (US); Christopher Michael Moore, Racine, WI (US); Gerrit-Tobias Speidel, Ludwigsburg (DE); Heinz Buehl, Erlenbach (DE); Alexander Korn, Gueglingen (DE)

(73) Assignees: Modine Manufacturing Company, Racine, WI (US); Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 14/461,955

(22) Filed: Aug. 18, 2014

(65) Prior Publication Data

US 2014/0345577 A1    Nov. 27, 2014

Related U.S. Application Data

(63) Continuation-in-part of application No. 14/178,492, filed on Feb. 12, 2014.

(60) Provisional application No. 61/766,031, filed on Feb. 18, 2013.

(51) Int. Cl.
*F02M 35/10* (2006.01)
*F02B 29/04* (2006.01)
*F02M 35/112* (2006.01)

(52) U.S. Cl.
CPC ........ *F02M 35/10268* (2013.01); *F02B 29/045* (2013.01); *F02B 29/0462* (2013.01); *F02M 35/112* (2013.01); *F02B 29/0475* (2013.01);
(Continued)

(58) Field of Classification Search
CPC ............ F02M 35/10; F02M 35/10268; F02M 35/10242; F02B 29/04; F02B 29/0462; F02B 29/0418; F02B 29/0437; F02B 29/045
USPC ............... 123/540, 542, 563, 184.21; 60/598, 60/599, 605.1; 165/41–44, 51, 52, 165/164–167, 157–159, 172–176, 202–204, 165/271; 180/68.1, 68.2, 68.3
See application file for complete search history.

(56) References Cited

U.S. PATENT DOCUMENTS 4,187,678 A * 2/1980 Herenius .......................... 60/321
4,214,443 A * 7/1980 Herenius .......................... 60/321
(Continued)

*Primary Examiner* — Lindsay Low
*Assistant Examiner* — Grant Moubry
(74) *Attorney, Agent, or Firm* — Michael Best & Friedrich LLP

(57) ABSTRACT

A charge air cooler includes a housing and a heat exchanger core positioned within the housing. The heat exchanger core includes a first core section, a second core section, and a centrally located section positioned between the first core section and the second core section. The charge air cooler also includes a plurality of coolant circuits. Each coolant circuit extends through at least one of the first and second core sections. The charge air cooler further includes a coolant inlet extending from the centrally located section to deliver coolant to the plurality of coolant circuits, and a coolant outlet extending from the centrally located section to receive coolant from the plurality of coolant circuits. The charge air cooler also includes a fastener extending through the centrally located section of the core to secure the core to the housing.

20 Claims, 9 Drawing Sheets

(52) U.S. Cl.
CPC ......... *F02M 35/10052* (2013.01); *Y02T 10/146* (2013.01)

(56) References Cited

U.S. PATENT DOCUMENTS

| | | | |
|---|---|---|---|
| 4,236,492 A * | 12/1980 | Tholen | 123/563 |
| 4,303,052 A * | 12/1981 | Manfredo et al. | 123/563 |
| 4,436,145 A * | 3/1984 | Manfredo et al. | 165/67 |
| 4,474,162 A * | 10/1984 | Mason | 123/563 |
| 4,562,697 A * | 1/1986 | Lawson | 60/599 |
| 6,293,264 B1 * | 9/2001 | Middlebrook | 123/563 |
| 7,347,248 B2 * | 3/2008 | Kolb et al. | 165/42 |
| 7,380,544 B2 * | 6/2008 | Raduenz et al. | 123/568.12 |
| 7,669,417 B2 * | 3/2010 | Smith | 60/599 |
| 8,225,852 B2 * | 7/2012 | Wu et al. | 165/140 |
| 8,286,615 B2 * | 10/2012 | Dehnen et al. | 123/542 |
| 8,316,925 B2 * | 11/2012 | Pimentel et al. | 165/152 |
| 8,695,574 B2 * | 4/2014 | Nguyen | 123/540 |
| 2008/0141985 A1 * | 6/2008 | Schernecker et al. | 123/568.12 |
| 2010/0071639 A1 * | 3/2010 | Wegner et al. | 123/41.08 |
| 2011/0017425 A1 | 1/2011 | Bourgoin et al. | |
| 2012/0167860 A1 * | 7/2012 | Wong et al. | 123/542 |

* cited by examiner

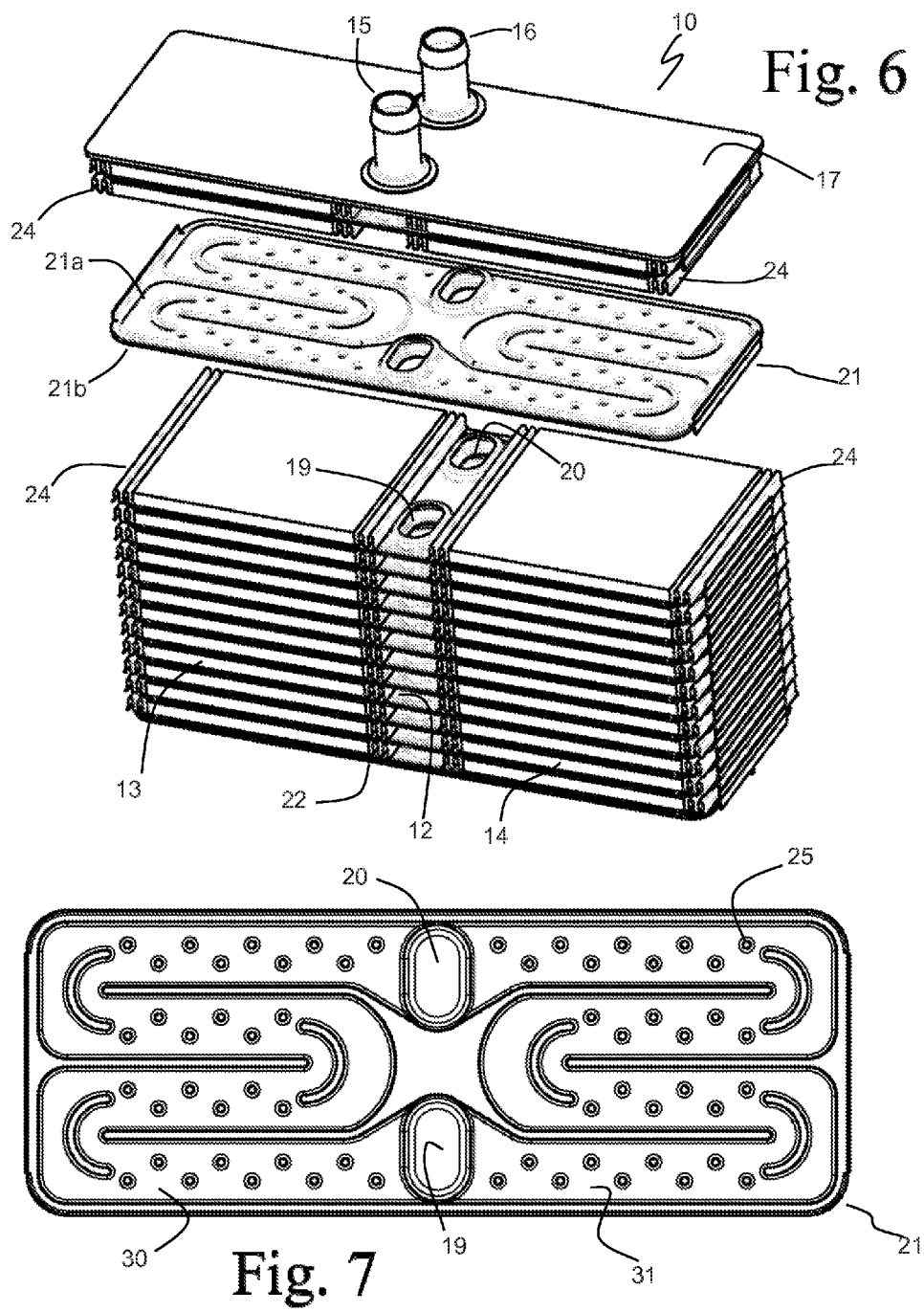

CHARGE AIR COOLER, AND INTAKE MANIFOLD INCLUDING THE SAME

CROSS-REFERENCE TO RELATED APPLICATIONS

This application is a continuation-in-part of U.S. patent application Ser. No. 14/178,492, filed Feb. 12, 2014, which claims priority to U.S. Provisional Patent Application No. 61/766,031, filed Feb. 18, 2013, the entire contents of both of which are hereby incorporated by reference.

BACKGROUND

Charge air coolers are used in conjunction with turbocharged internal combustion engine systems. In such systems, residual energy from the combustion exhaust is recaptured through an exhaust expansion turbine, and the recaptured energy is used to compress or "boost" the pressure of the incoming air (referred to as the "charge air") being supplied to the engine. This raises the operating pressure of the engine, thereby increasing the thermal efficiency and providing greater fuel economy.

The compression of the charge air using the exhaust gases typically leads to a substantial increase in temperature of the air. Such a temperature increase can be undesirable for at least two reasons. First, the density of the air is inversely related to its temperature, so that the amount of air mass entering the combustion cylinders in each combustion cycle is lower when the air temperature is elevated, leading to reduced engine output. Second, the production of undesirable and/or harmful emissions, such as oxides of nitrogen, increases as the combustion temperature increases. The emissions levels for internal combustion engines is heavily regulated, often making it necessary to control the temperature of the air entering the combustion chambers to a temperature that is relatively close to the ambient air temperature. As a result, cooling of the charge air using charge air coolers has become commonplace for turbocharged engines.

In some applications, the charge air is cooled using a liquid coolant (for example, engine coolant). A charge air cooler that uses liquid coolant to cool the charge air can be mounted directly to the engine, and in some cases can be located directly within the air intake manifold of the engine. Such an arrangement can pose problems, however. In order to route the liquid coolant into and out of the charge air cooler, the flow of the charge air may be blocked in certain portions of the cooler. While attempts are made to minimize the impact of such blockages, they have been found to have substantial impact on the distribution of the air to each of the individual cylinders, causing inefficiencies in the operation of the engine. Thus, there is still room for improvement.

SUMMARY

According to an embodiment of the invention, an air intake manifold for an engine includes an air inlet to receive a flow of compressed charge air, and multiple runners to deliver cooled compressed charge air to corresponding combustion cylinders of the engine. A charge air cooler is arranged within the intake manifold between the air inlet and the runners, and includes a first core section, a second core section, a coolant inlet manifold, and a coolant outlet manifold. The coolant inlet manifold and the coolant outlet manifold are arranged between the first and second core sections. The first and second core sections are arranged fluidly in parallel with respect to the flow of compressed charge air, so that the charge air is divided into first portion that is substantially directed through the first core section to a first subset of the runners, and a second portion that is substantially directed through the second core section to a second subset of the runners.

In some embodiments of the invention, the coolant inlet and outlet manifolds substantially block the flow of charge air through a third section of the charge air cooler between the first and second core sections. In some embodiments the third section is aligned, in the flow direction of the cooled compressed charge air exiting the charge air cooler, with a spacing located between two adjacent runners. In some embodiments, the number of runners is even, and the two adjacent runners are the center-most two runners.

In some embodiments the first subset of the runners and the second subset of runners each consist of half of the runners. In some embodiments the first and second portions of the flow of charge air are substantially equal.

According to another embodiment of the invention, a charge air cooler includes a coolant inlet, a coolant outlet, a first coolant manifold to receive a flow of coolant from the coolant inlet, and a second coolant manifold to deliver coolant to the coolant outlet. The first and second coolant manifolds substantially block the flow of charge air through a centrally located section of the charge air cooler. A first set of coolant circuits extends between the first and second coolant manifolds in a first core section located adjacent to, and on a first side of, the centrally located section. A second set of coolant circuits extends between the first and second coolant manifolds in a second core section located adjacent to, and on a second side of, the centrally located section, opposite the first side. A first set of charge air flow channels extends through the first core section in heat transfer relationship with the first set of coolant circuits. A second set of charge air flow channels extends through the second core section in heat transfer relationship with the second set of coolant circuits.

In some embodiments the charge air cooler includes coolant plate pairs arranged into a stack configuration. The first and second sets of charge air flow channels are defined between adjacent plate pairs. In some embodiments each of the plate pairs includes a portion of the first coolant manifold and a portion of the second coolant manifold. A first coolant circuit that is part of the first set of coolant circuits extends between the portion of the first coolant manifold and the portion of the second coolant manifold. A second coolant circuit that is part of the second set of coolant circuits extends between the portion of the first coolant manifold and the portion of the second coolant manifold.

In some embodiments, the first set of charge air flow channels define a first flow area for the charge air, and the second set of charge air flow channels define a second flow area for the charge air. In some embodiments the first flow area is substantially equal to the second flow area.

In some embodiments coolant flowing through the first set of coolant circuits is in cross-counter flow orientation to charge air flowing through the first set of charge air flow channels. Coolant flowing through the second set of coolant circuits is in cross-counter flow orientation to charge air flowing through the second set of charge air flow channels.

In some embodiments, fin structures are arranged in the first and second sets of flow channels. In some such embodiments the fin structures define a correlation of pressure drop to charge air flow per unit area, and the correlation in the first section is substantially different than the correlation in the second section.

According to another embodiment of the invention, a charge air cooler includes a housing and a heat exchanger core positioned within the housing. The heat exchanger core includes a first core section, a second core section, and a centrally located section positioned between the first core section and the second core section. The charge air cooler also includes a plurality of coolant circuits. Each of the plurality of coolant circuits extends through at least one of the first and second core sections. The charge air cooler further includes a coolant inlet extending from the centrally located section. The coolant inlet is configured to deliver coolant to the plurality of coolant circuits. The charge air cooler also includes a coolant outlet extending from the centrally located section. The coolant outlet is configured to receive coolant from the plurality of coolant circuits. The charge air cooler further includes a fastener extending through the centrally located section of the heat exchanger core to secure the heat exchanger core to the housing.

According to yet another embodiment of the invention, a charge air cooler includes a housing and a heat exchanger core positioned within the housing. The heat exchanger core has a first end and a second end. The charge air cooler also includes a coolant inlet extending from the housing in fluid communication with the heat exchanger core, a coolant outlet extending from the housing in fluid communication with the heat exchanger core, a plurality of coolant circuits formed in the heat exchanger core and extending between the coolant inlet and the coolant outlet, and a plurality of charge air flow channels extending from the first end of the heat exchanger core to the second end of the heat exchanger core in heat transfer relationship with the plurality of coolant circuits. The charge air cooler further includes a fastener extending through the heat exchanger core to secure the heat exchanger core to the housing. The fastener is located centrally between the first end and the second end of the heat exchanger core.

According to still another embodiment of the invention, an air intake manifold for an engine includes an air inlet to receive a flow of compressed charge air, a plurality of runners to deliver cooled compressed air to a corresponding plurality of combustion cylinders of the engine, and a charge air cooler arranged within the air intake manifold between the air inlet and the runners. The charge air cooler includes a housing and a heat exchanger core positioned within the housing and having a first end adjacent the air inlet and a second end adjacent the plurality of runners. The heat exchanger core includes a first core section, a second core section, and a centrally located section positioned between the first core section and the second core section. The charge air cooler also includes a plurality of coolant circuits. Each of the plurality of coolant circuits extend through at least one of the first and second core sections. The charge air cooler further includes a coolant inlet extending from the centrally located section. The coolant inlet is configured to deliver coolant to the plurality of coolant circuits. The charge air cooler also includes a coolant outlet extending from the centrally located section. The coolant outlet is configured to receive coolant from the plurality of coolant circuits. The charge air cooler further includes a first plurality of charge air flow channels extending through the first core section from the first end of the heat exchanger core to the second end of the heat exchanger core in heat transfer relationship with at least some of the plurality of coolant circuits, a second plurality of charge air flow channels extending through the second core section from the first end of the heat exchanger core to the second end of the heat exchanger core in heat transfer relationship with at least some of the plurality of coolant circuits, and a fastener extending through the centrally located section of the heat exchanger core to secure the heat exchanger core to the housing.

BRIEF DESCRIPTION OF THE DRAWINGS

FIG. 6 is a perspective view of the charge air cooler of FIG. 5 in a partially exploded state.

FIG. 7 is a plan view of certain parts of the charge air cooler of FIGS. 4 and 5.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
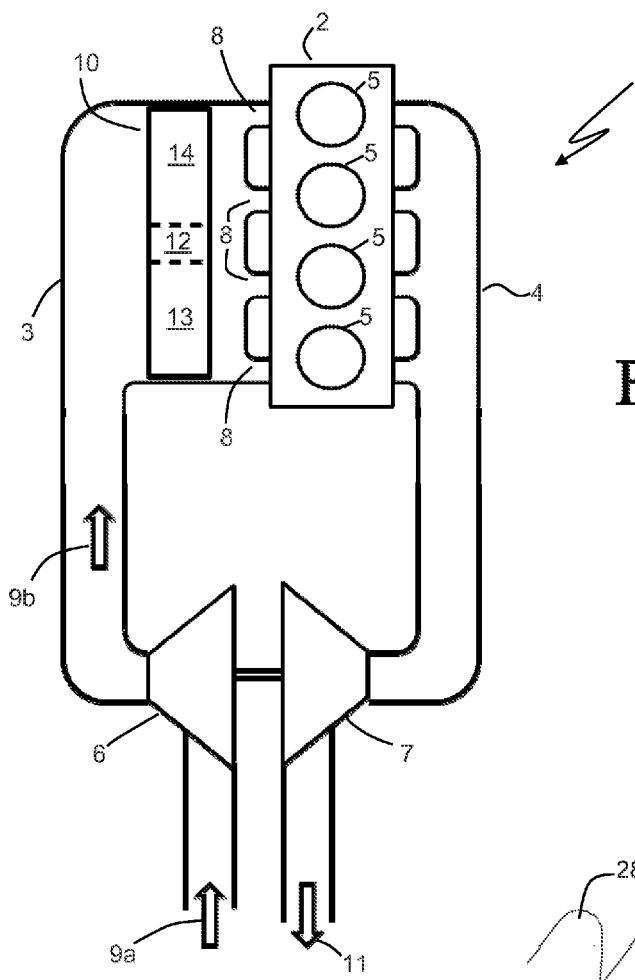
FIG. 1 is a schematic diagram of a portion of an engine system including an embodiment of the present invention.
Figure 8:
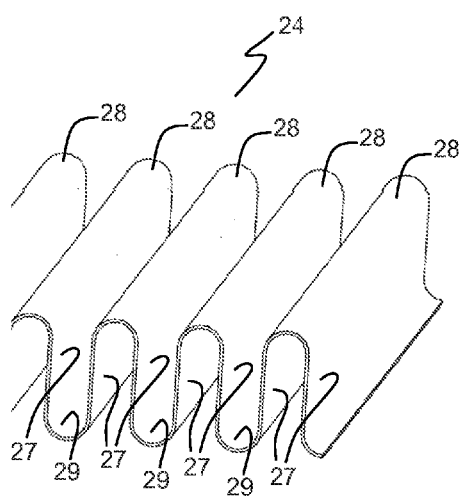
FIG. 8 is a partial view of certain parts of the charge air cooler of FIGS. 4 and 5.
Figure 2:
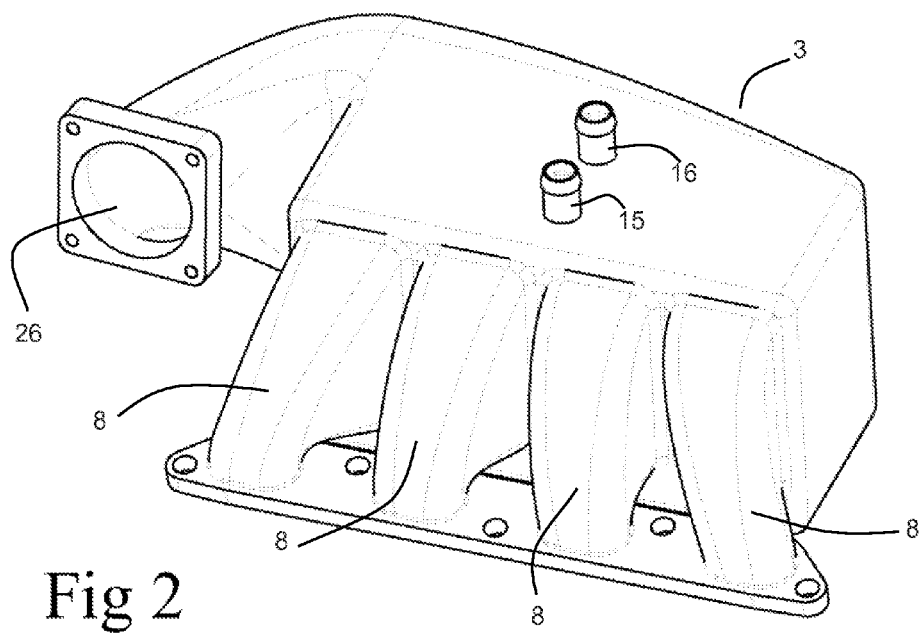
FIG. 2 is a perspective view of an intake manifold according to an embodiment of the invention.

A portion of a combustion engine system 1 according to an embodiment of the invention is illustrated in FIG. 1. The illustrated engine system 1 may find particular applicability as a motive power source for an automobile or similar vehicle. Alternatively, the engine system 1 can be used in other vehicular applications including commercial vehicles, vocational vehicles, off-highway vehicles, agricultural vehicles, etc., or in stationary power generation applications, or in other applications that make use of a combustion engine to produce useful work.

The system 1 includes an engine block 2 containing several combustion cylinders 5. In the illustrated embodiment the engine block 2 contains four such cylinders 5, but it should be understood that the invention can be used in similar fashion in a system containing more, or fewer, combustion cylinders. A flow of uncompressed air 9a is delivered to the cylinders 5 by way of a compressor or turbocharger 6, wherein the air is compressed to a pressurized flow of charge air 9b. The flow of charge air 9b is directed through an intake manifold 3, and is routed to the combustion cylinders 5 through runners 8, the runners 8 being in a one-to-one correspondence with the cylinders 5.

Due to thermodynamic inefficiencies in the compression process, the flow of charge air 9b enters the intake manifold at a temperature that is substantially elevated from that of the incoming air 9a. Such an elevated temperature can be undesirable, as it can lead to an increase in the concentration of some regulated harmful emissions (for example, oxides of nitrogen) in the exhaust of the engine. In order to ameliorate the foregoing, a charge air cooler 10 is provided within the intake manifold 3 upstream of the runners 8. The charge air cooler 10 includes several sections (numbered 12, 13, and 14) which will be described in greater detail with reference to FIGS. 2-8.

The charge air 9b, having been cooled by passing through the charge air cooler 10, is distributed among the runners 8 and enters the cylinders 5, wherein it is used as the oxidizer for the combustion of a liquid or gaseous fuel. The resultant exhaust 11 exits the cylinders 5 into an exhaust manifold 4 and is directed through an expansion turbine 7 coupled to compressor 6, wherein residual energy contained in the exhaust 11 is used to compress the incoming air 9a.

It should be understood by those skilled in the art that only a relevant portion of the engine system 1 has been shown, and that the engine system 1 includes many additional components which have not been included for the sake of clarity.

Turning now to FIGS. 2-8, the air intake manifold 3 and integrated charge air cooler 10 will be described in greater detail. As illustrated, the air intake manifold 3 includes an inlet 26 to receive the flow of compressed and heated charge air 9b from the compressor 6. The charge air cooler 10 is arranged within the air intake manifold 3 and extends across the full width and height of the air intake manifold 3 so that the undesirable bypassing of charge air around the charge air cooler 10 is reduced or eliminated. Heat is transferred from the flow of charge air 9b as it passes through the charge air cooler 10 to a flow of coolant simultaneously passing through the charge air cooler 10.

A coolant inlet port 15 and a coolant outlet port 16 extend through the exterior wall of the air intake manifold 3, and allow the charge air cooler 10 to be fluidly coupled to a coolant system (not shown) so that coolant can be delivered to charge air cooler 10 by way of the coolant inlet port 15, and can be removed from the charge air cooler 10 by way of the coolant outlet port 16. The coolant is circuited through the charge air cooler 10 between the coolant inlet port 15 and the coolant outlet port 16 so that the transfer of heat from the compressed charge air 9b as it passes through the charge air cooler 10 is facilitated, and the charge air exits the charge air cooler 10 as a flow of cooled charge air 9c.

It can be observed that the coolant inlet port 15 and the coolant outlet port 16 are arranged so as to coincide with a centrally located section 12 of the charge air cooler 10. By "centrally located", it is meant that the section 12 is arranged to be between a first core section 13 and a second core section 14 of the charge air cooler 10 in a width direction of the charge air cooler 10. While the illustrated embodiment shows that the first core section 13 and the second core section 14 are of equal dimension in the width direction, such that the section 12 is located at the true center of the charge air cooler 10 in the width direction, in other embodiments one of the core sections 13, 14 can be larger than the other of the core sections 13, 14. In such an embodiment the section 12 will not be located at the exact center of the charge air cooler 10 in the width direction, but is still considered to be centrally located.

Figure 5:
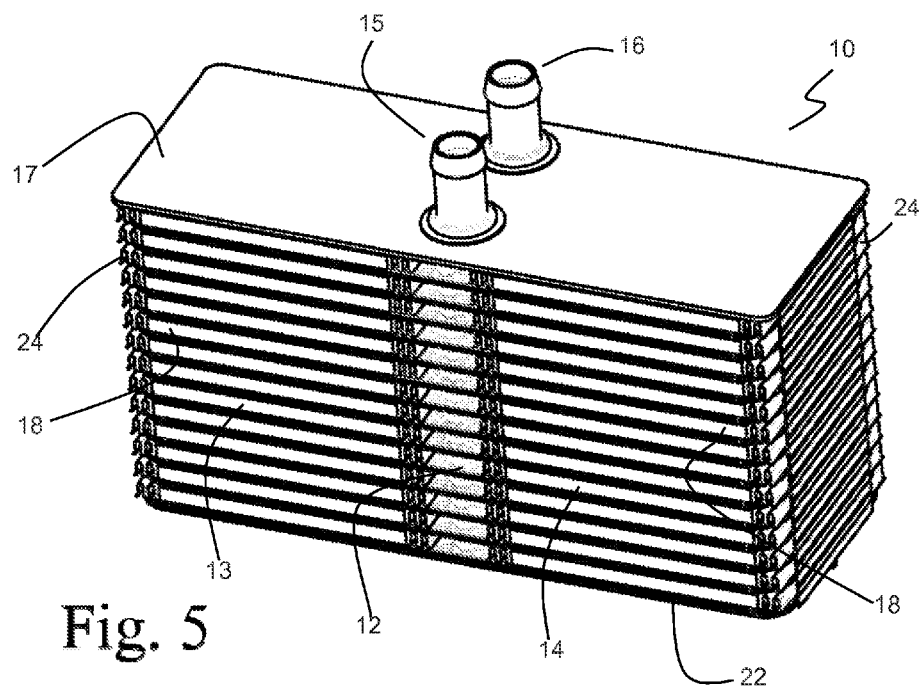
FIG. 5 is a perspective view of a charge air cooler according to an embodiment of the invention.

With specific reference to FIGS. 5 and 6, the exemplary embodiment of the charge air cooler 10 is of a stacked or layered construction. Coolant plate pairs 21 are interleaved with charge air flow passages 18 between a top plate 17 and a bottom plate 22. A coolant inlet manifold 19 extends through the stack of coolant plate pairs 21 and fluidly connects to the coolant inlet port 15 to receive the flow of coolant and distribute it to each of the coolant plate pairs 21. Similarly, a coolant outlet manifold 20 extends through the stack of coolant plate pairs 21 and fluidly connects to the coolant outlet port 16 to receive the flow of coolant from each of the coolant plate pairs 21. Each of the coolant plate pairs 21 defines a portion of the coolant inlet manifold 19, and a portion of the coolant outlet manifold 20.

Each of the coolant plate pairs includes a first plate 21a and a second plate 21b. The plate 21a and the plate 21b are joined to define a sealed outer perimeter and an internal volume within the coolant plate pair 21, with that internal volume fluidly communicating with the coolant inlet manifold 19 and the coolant outlet manifold 20. The plates 21a and 21b together define between them a first coolant circuit 30 extending between the coolant inlet manifold 19 and the coolant outlet manifold 20 through the first core section 13. Similarly, the plates 21a and 21b together define between them a second coolant circuit 31 extending between the coolant inlet manifold 19 and the coolant outlet manifold 20 through the second core section 14.

In the illustrated embodiment the coolant circuits 30 and 31 defined by each plate pair 21 are all arranged in parallel with one another, such that the coolant flow entering the charge air cooler 10 by way of the coolant inlet port 15 is distributed, by way of the coolant inlet manifold 19, to each of the individual coolant circuits 30 and 31 in somewhat equal proportion. In other embodiments, it may be preferable to arrange at least some of the coolant circuits 30, 31 to be in series with other such coolant circuits, such as by including flow baffles within the manifolds 19 and 20. Dimples 25 can be provided (but are not required) in the plates 21a and 21b, and can provide both flow turbulation for the coolant passing through the coolant flow circuits 30 and 31, and structural support for the plate pair 21. Alternatively, one or more inserts can be provided within the space between the plates 21a and 21b to provide similar effect.

As best seen in FIG. 7, in the exemplary embodiment the coolant circuits 30 and 31 define a convoluted path between the manifolds 19 and 20, with each circuit 30 and each circuit 31 including multiple passes in the width direction of the charge air cooler 10. The specific embodiment shown in the Figures includes four such passes, but it should be understood that more or fewer passes may be desirable in other embodiments.

As one advantage of the present invention, by locating the manifolds 19 and 20 at the center of the charge air cooler 10 in the width direction, rather than at the ends, the resulting pressure drop imposed on the coolant as it passes through the charge air cooler 10 can be substantially reduced. Specifically, for a given number of coolant passes across the depth of the charge air cooler 10, the total flow length between the manifolds 19 and 20 is reduced by half, while the total coolant flow area within each plate pair 21 is doubled, resulting in one-fourth the coolant pressure drop as compared to a more conventional charge air cooler having the coolant manifolds located at one of the ends. Achieving a similarly desirable pressure drop in such a conventional charge air cooler would necessitate reducing the number of convolutions to two. It is known, however, that the heat transfer effectiveness increases as the number of coolant passes arranged in a counter-cross flow orientation to the charge air is increased, making such a charge air cooler less desirable than the charge air cooler 10.

As another advantage of the present invention, the undesirable bypassing of uncooled charge air 9b around the charge air cooler 10 is significantly reduced by extending the charge air flow channels 18 to both outer edges of the charge air cooler in the width direction. Such an arrangement avoids the difficulties inherent in sealing off bypass flow around the coolant manifolds by arranging the core sections 13 and 14 on either side of the coolant manifolds 19 and 20. Additionally, the structural stresses induced by differential thermal expansion of the charge air cooler 10 relative to the air intake manifold 3 are substantially reduced by relocating the coolant inlet and outlet ports 15 and 16 to the center of the charge air cooler 10, thereby reducing by half the free length of the charge air cooler 10.

Figure 3:
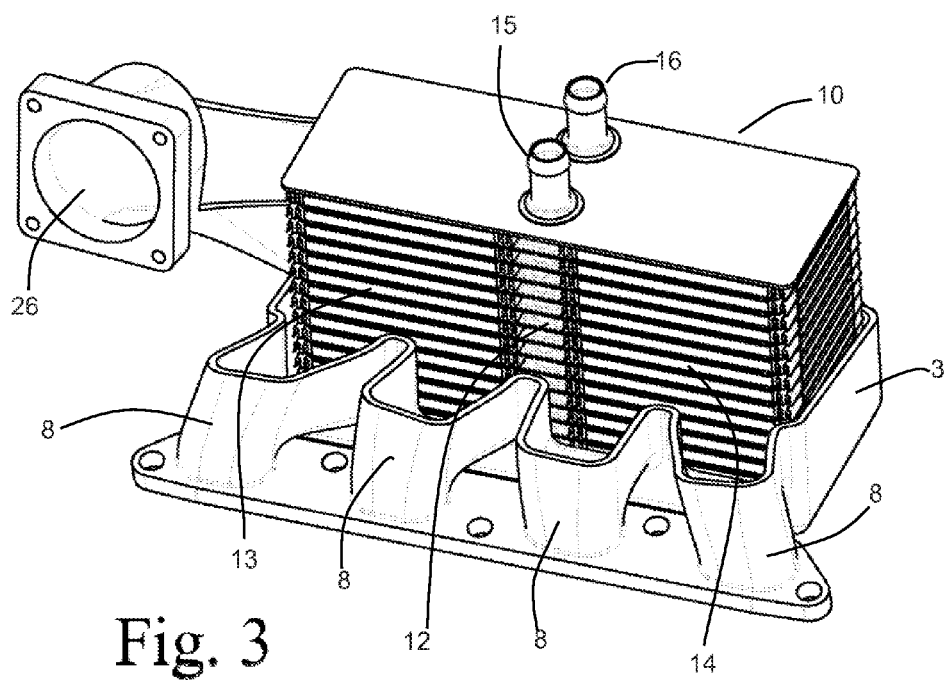
FIG. 3 is a partially sectioned perspective view of the intake manifold of FIG. 2.

In order to improve the rate of heat transfer from the compressed charge air 9b, as well as to provide structural support to adjacent plates pairs 21, convoluted fin structures 24 are arranged within the charge air flow passages 18. Aspects of the convoluted fin structures 24 are specifically detailed in FIG. 8. In FIGS. 3, 5, and 6 only the end few convolutions of each structure 24 are illustrated, but it should be understood that the convolutions extend in similar fashion over the entirety of each structure 24.

Each convoluted fin structure 24 includes a series of flanks 27 extending in the charge air flow direction, each of the flanks 27 joined to one (in the case of the end flanks) or two adjacent flanks 27 by alternatingly arranged crests 28 and troughs 29. The flanks 27 can be planar, as shown in the illustrated embodiment, or can be augmented with heat transfer enhancing features such as corrugations, lances, louvers, bumps, or other types of surface augmentations known to those skilled in the art of heat transfer. The convoluted fin structures 27 can be readily formed from a continuous sheet of metal material by stamping or rolling. As the charge air 9b passes through the charge air flow passages 18, heat from the charge air 9b is convectively transferred to the exposed surface area of the convoluted fin structures 24, and is conductively transferred to the plate pairs 21 through the contact therewith of the crests 28 and troughs 29.

In certain preferable embodiments the charge air cooler 10 components (e.g. the plates 21a and 21b, the convoluted fin structures 24, the top plate 17, the bottom plate 22, the coolant inlet 15, and the coolant outlet 16) are made of aluminum or an aluminum alloy. In some highly preferable embodiments some or all of the charge air cooler 10 components are joined together by brazing.

Figure 4:
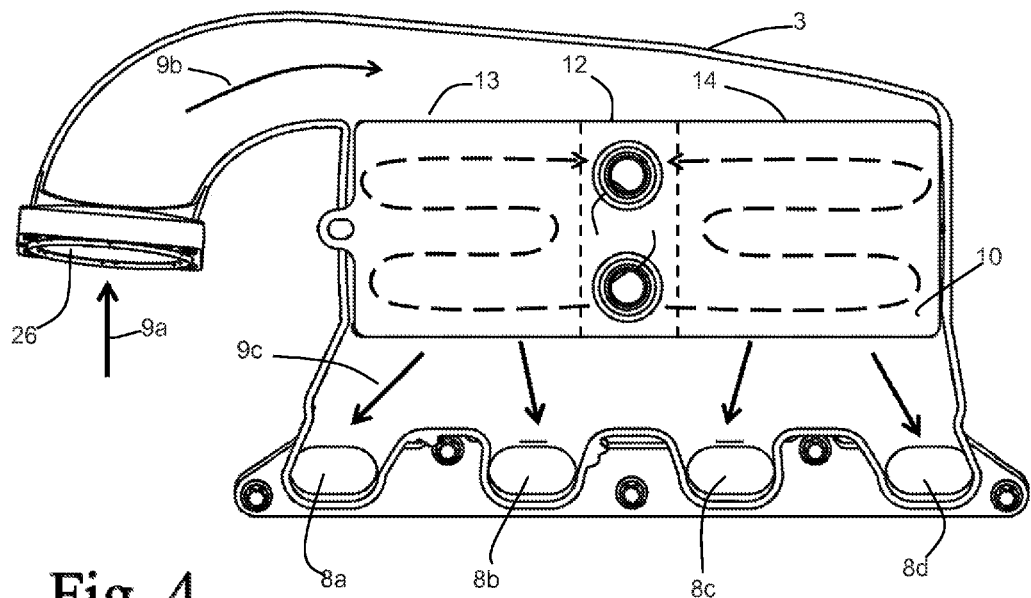
FIG. 4 is a plan view of the intake manifold of FIGS. 2 and 3.

With specific reference to FIG. 4, it can be observed that the centrally located section 12 of the charge air cooler 10 is aligned, in the direction of the charge air flow through the charge air cooler 10, with the space between the central-most ones of the runners 8 (i.e. runner 8b and runner 8c). The manifolds 19 and 20 extending through the centrally located section 12 substantially block the passage of charge air 9b through that section, so that substantially all of the charge air 9b is directed, in somewhat equal proportion, through the core sections 13 and 14.

With the flow of charge air 9b being distributed approximately evenly through the sections 13 and 14, and with an equal number of runners 8 arranged on either side of the centrally located section 12, a uniform distribution of cooled charge air 9c to each of the runners 8 can be achieved. Specifically, that portion of the charge air 9b passing through the core section 13 is distributed as cooled charge air 9c to the runners 8a and 8b, while that portion of the charge air 9b passing through the core section 14 is distributed as cooled charge air 9c to the runners 8c and 8d. Computational analysis has shown that such an arrangement is capable of providing substantially uniform distribution of the cooled charge air 9c to all of the runners 8. In contradistinction, similar analysis has shown that a charge air cooler with the coolant inlet and outlet manifolds arranged at one of the ends of the cooler can lead to the runner located at that same end receiving only half of its proportion of air.

In some embodiments, certain aspects of the charge air cooler 10 can be adjusted to further improve the distribution of cooled charge air 9c. For example, the profile of the intake manifold between the inlet 26 and the inlet face of the charge air cooler 10 might not be optimized for uniform distribution of the charge air 9b to each of the core sections 13 and 14. To overcome this, the centrally located section 12 can be shifted to one side of the exact center, so that one of the sections 13, 14 has a greater width than the other of the sections 13, 14, thus increasing the amount of air flow through that one of the sections. Alternatively, the widths of the sections 13, 14 can be kept uniform, and specific aspects of the convoluted fin structures 24 can be adjusted so that they are different in the two sections. For example, the spacing between adjacent flanks 27 can be reduced in that one of the sections 13, 14 which would otherwise receive more flow, so that the correlation of pressure drop to charge air flow per unit area in that section is greater than such correlation in the other one of the sections.

FIGS. 9-13 illustrate another charge air cooler 100 for use with the intake manifold 3 (FIG. 1). The charge air cooler 100 is substantially similar to the charge air cooler 10 discussed above. Reference is hereby made to the charge air cooler 10 for description of features and elements of the charge air cooler 100 not specifically described below.

Figure 9:
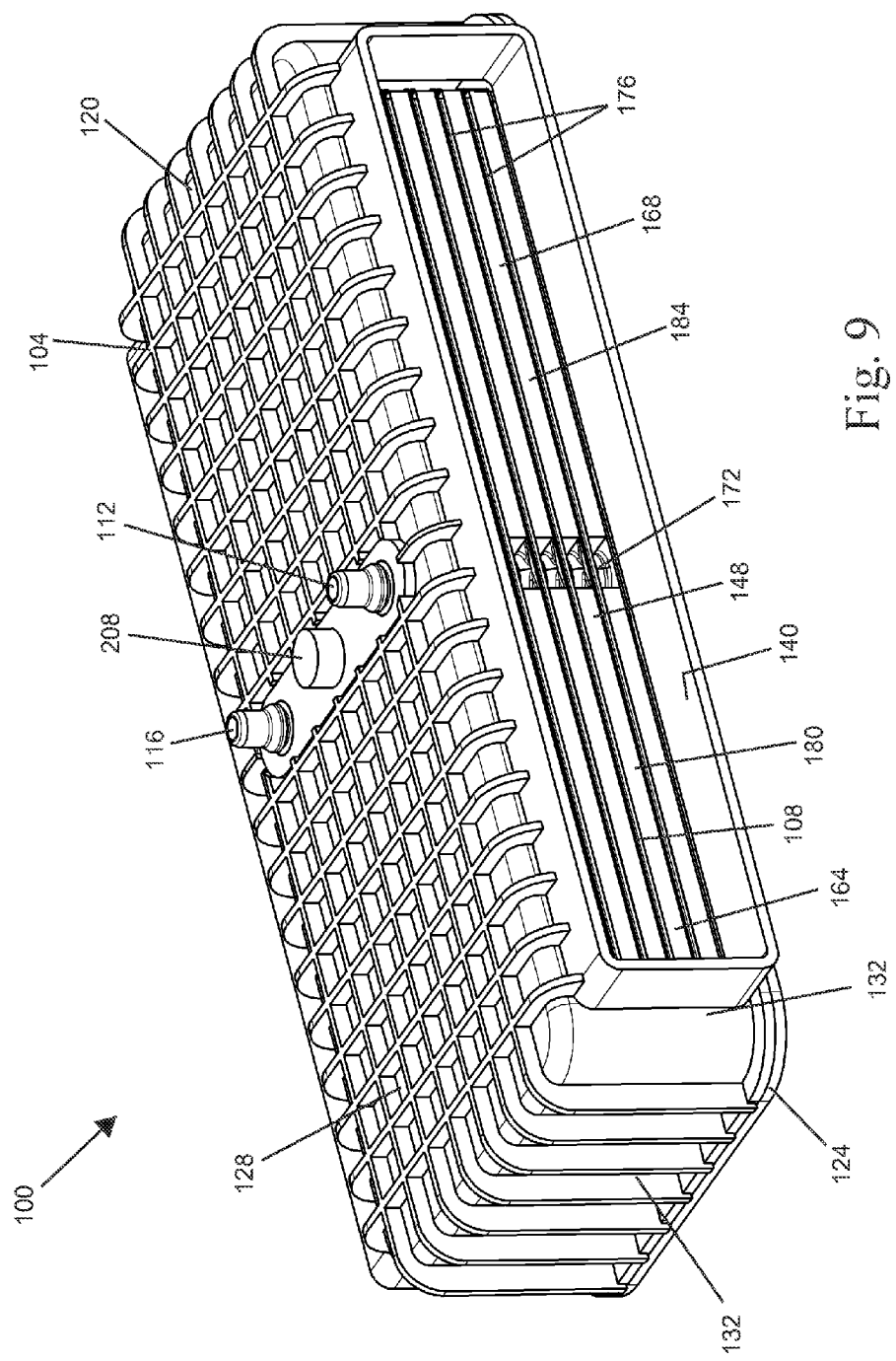
FIG. 9 is a perspective view of a charge air cooler according to another embodiment of the invention.
Figure 10:
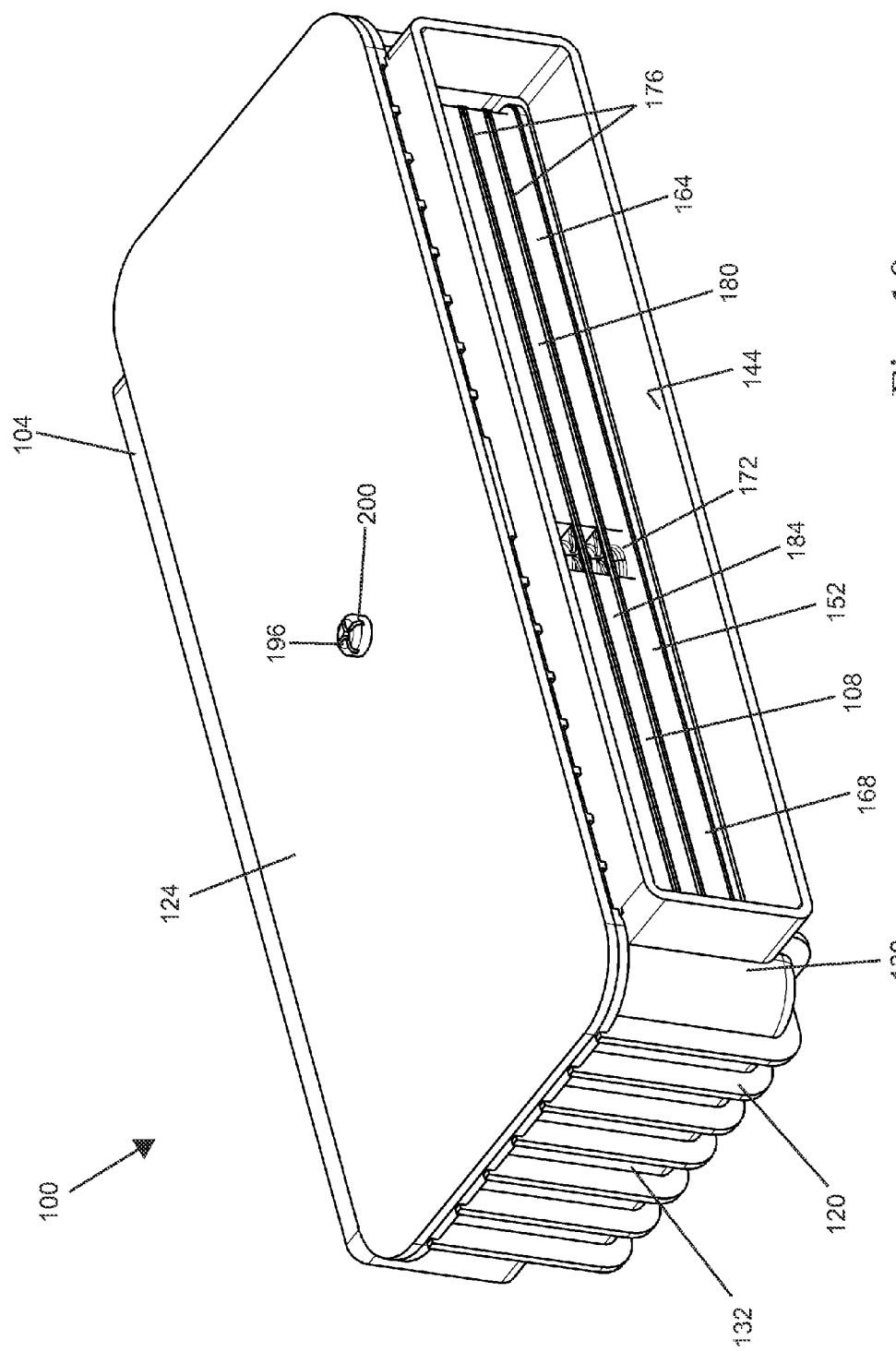
FIG. 10 is another perspective view of the charge air cooler of FIG. 9.
Figure 11:
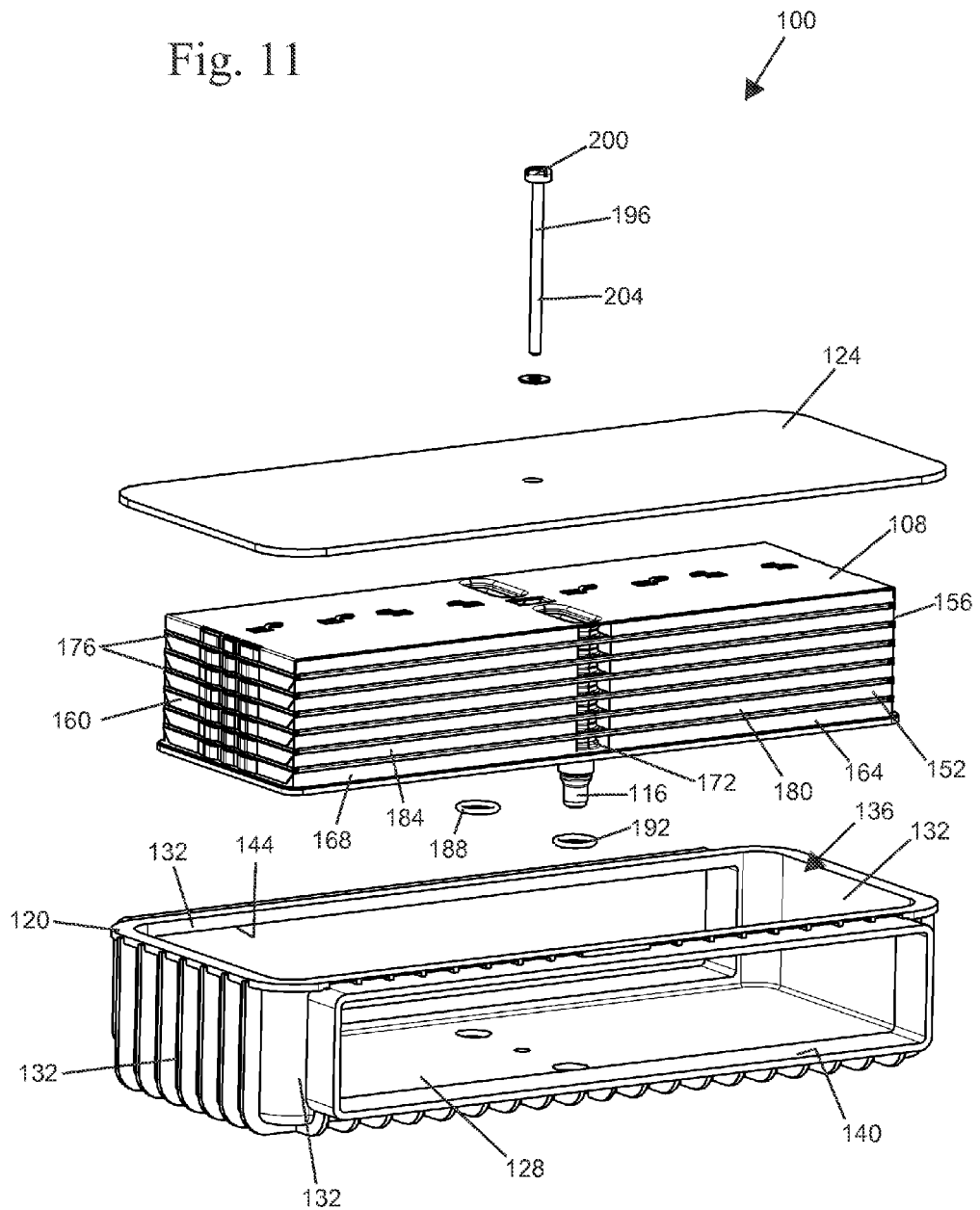
FIG. 11 is an exploded perspective view of the charge air cooler of FIG. 9.

The illustrated charge air cooler 100 includes a housing 104, a heat exchanger core 108, a coolant inlet 112, and a coolant outlet 116. As shown in FIG. 11, the housing 104 includes two housing portions 120, 124 that couple together to form the housing 104. In some embodiments, the housing portions 120, 124 may be made of, for example, a plastic material. The first housing portion 120 includes a base 128 and sidewalls 132 that define an interior volume 136. The interior volume 136 is shaped and sized to receive the core 108. As shown in FIG. 9, one of the sidewalls 132 defines an inlet opening 140 that communicates with the compressor 6 (FIG. 1) to receive the flow of charge air 9b. As shown in FIG. 10, another sidewall 132 defines an outlet opening 144 that communicates with the runners 8. Referring back to FIG. 10, the second housing portion 124 is a generally planar plate that extends over an open side of the first housing portion 120 opposite from the base 128. In some embodiments, an elastomeric member may be located between the first housing portion 120 and the second housing portion 124 to provide a seal.

The heat exchanger core 108 is positioned within the interior volume 136 of the housing 104. The core 108 has a first end 148, a second end 152, a first side 156, and a second side 160. The first end 148 is adjacent the inlet opening 140 of the housing 104 and, thereby, the air inlet 26 (FIG. 4) of the air intake manifold 3. The second end 152 is adjacent the outlet opening 144 of the housing 104 and, thereby, the runners 8 (FIG. 1). Each side 156, 160 extends between the first end 148 and the second end 152 of the core 108. The illustrated heat exchanger core 108 also includes three core sections 164, 168, 172. Each core section 164, 168, 172 extends between the first and second ends 148, 152 of the core 108. The first core section 164 is located adjacent the first side 156 of the core 108. The second core section 168 is located adjacent the second side 160 of the core 108. The third core section 172 is a centrally located section located between the first and second core sections 164, 168.

In the illustrated embodiment, the heat exchanger core 108 comprises a plurality of plate pairs 176 arranged in a stack or layered configuration (similar to the plate pairs 21 discussed above). The plate pairs 176 define coolant circuits (see, for example, coolant circuits 30, 31 in FIG. 7) extending between the coolant inlet 112 and the coolant outlet 116. In particular, a first plurality of coolant circuits is defined by the plate pairs 176 in the first core section 164, and a second plurality of coolant circuits is defined by the plate pairs 176 in the second core section 168. The coolant circuits define convoluted paths between the coolant inlet 112 and the coolant outlet 116 for coolant to flow through.

Charge air flow channels 180, 184 are also defined between the plate pairs 176 of the heat exchanger core 108. In particular, a first plurality of charge air flow channels 180 is defined between adjacent plate pairs 176 in the first core section 164, and a second plurality of charge air flow channels 184 is defined between adjacent plate pairs 176 in the second core section 168. Both pluralities of charge air flow channels 180, 184 extend from the first end 148 of the core 108 to the second end 152 of the core 108. The flow of charge air 9*b* (FIG. 1) passes through the charge air flow channels 180, 184 to travel through the core 108. The first plurality of charge air flow channels 180 is in heat transfer relationship with the first plurality of coolant circuits so that heat is transferred from the flow of charge air 9*b* to the coolant in the first plurality of coolant circuits as the charge air 9*b* flows through the first core section 164. The second plurality of charge air flow channels 184 is in heat transfer relationship with the second plurality of coolant circuits so that heat is transferred from the flow of charge air 9*b* to the coolant in the second plurality of coolant circuits as the charge air 9*b* flows through the second core section 168.

As shown in FIG. 9, the coolant inlet 112 and the coolant outlet 116 extend from the housing 104. In the illustrated embodiment, the coolant inlet 112 and the coolant outlet 116 are connected to and extend from the centrally located section 172 of the heat exchanger core 108. In other embodiments, the coolant inlet 112 and the coolant outlet 116 may be located elsewhere on the core 108. The coolant inlet 112 and the coolant outlet 116 are configured to be fluidly coupled to a coolant system so that coolant can be delivered to the charge air cooler 100 by way of the coolant inlet 112, and can be removed from the charge air cooler 100 by way of the coolant outlet 116. The coolant is circuited through the coolant circuits of the charge air cooler 100 between the coolant inlet 112 and the coolant outlet 116. As shown in FIG. 11, a first elastomeric seal 188 (e.g., O-ring) surrounds a portion of the coolant inlet 112 to create a seal between the coolant inlet 112 and the housing 104. A second elastomeric seal 192 (e.g., O-ring) surrounds a portion of the coolant outlet 116 to create a seal between the coolant outlet 116 and the housing 104.

In some alternative embodiments, the coolant circuits extending between the coolant inlet 112 and the coolant outlet 116 can be at least partially defined by flow turbulation inserts, fins, or the like arranged between adjacent plate pairs 176. It may be preferable in some applications for the coolant circuits to pass through both the first core section 164 and the second core section 168 as the coolant circuits extend from the coolant inlet 112 to the coolant outlet 116.

With continued reference to FIG. 11, the illustrated charge air cooler 100 also includes a fastener 196. The fastener 196 extends through the heat exchanger core 108 and the housing 104 to secure the core 108 to the housing 104. In the illustrated embodiment, the fastener 196 is centrally located on the charge air cooler 100. That is, the fastener 196 extends through the centrally located section 172 of the core 108. In addition, the fastener 196 is evenly spaced between the first end 148 and the second end 152 of the core 108, and is evenly spaced between the first side 156 and the second side 160 of the core 108.

In the illustrated embodiment, the fastener 196 is a threaded bolt. The bolt 196 includes a head 200 and a threaded shaft 204. The shaft 204 extends through the core 108, while the head 200 abuts one side of the housing 104 (e.g., adjacent the second housing portion 124 in the figures). The shaft 204 threads into a boss 208 (FIGS. 9 and 12) formed in the first housing portion 120 to secure the bolt 196 in place. In some embodiments, a nut may be threaded onto the end of the bolt 196 to secure the bolt 196 in place. In other embodiments, other types of fasteners may also or alternatively be employed.

As shown in FIG. 9, the fastener 196 is positioned between the coolant inlet 112 and the coolant outlet 116. The coolant inlet 112 is positioned adjacent the first end 148 of the core 108 and the inlet opening 140 of the housing 104, while the coolant outlet 116 is positioned adjacent the second end 152 of the core 108 and the outlet opening 144 of the housing 104. However, in some embodiments it may be desirable to reverse the positioning of the coolant inlet 112 and the coolant outlet 116 in order to arrange the coolant and air flows to be in an overall counter-flow orientation through the charge air cooler 100. In addition, the coolant inlet 112 and the coolant outlet 116 are equally spaced from the fastener 196. Such an arrangement balances the charge air cooler 100 around the fastener 196.

Figure 12:
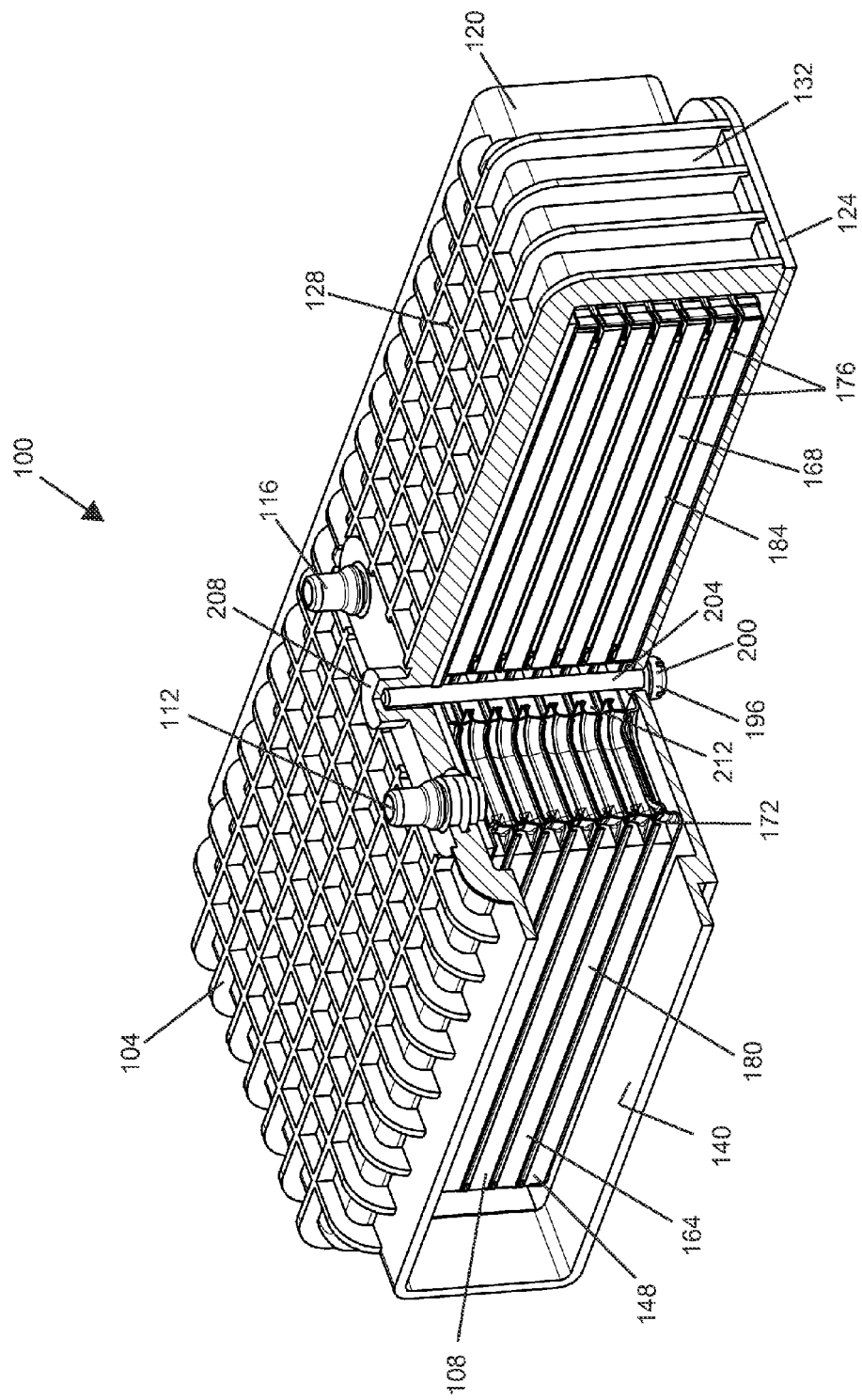
FIG. 12 is a perspective, partial cross-sectional view of the charge air cooler of FIG. 9.
Figure 13:
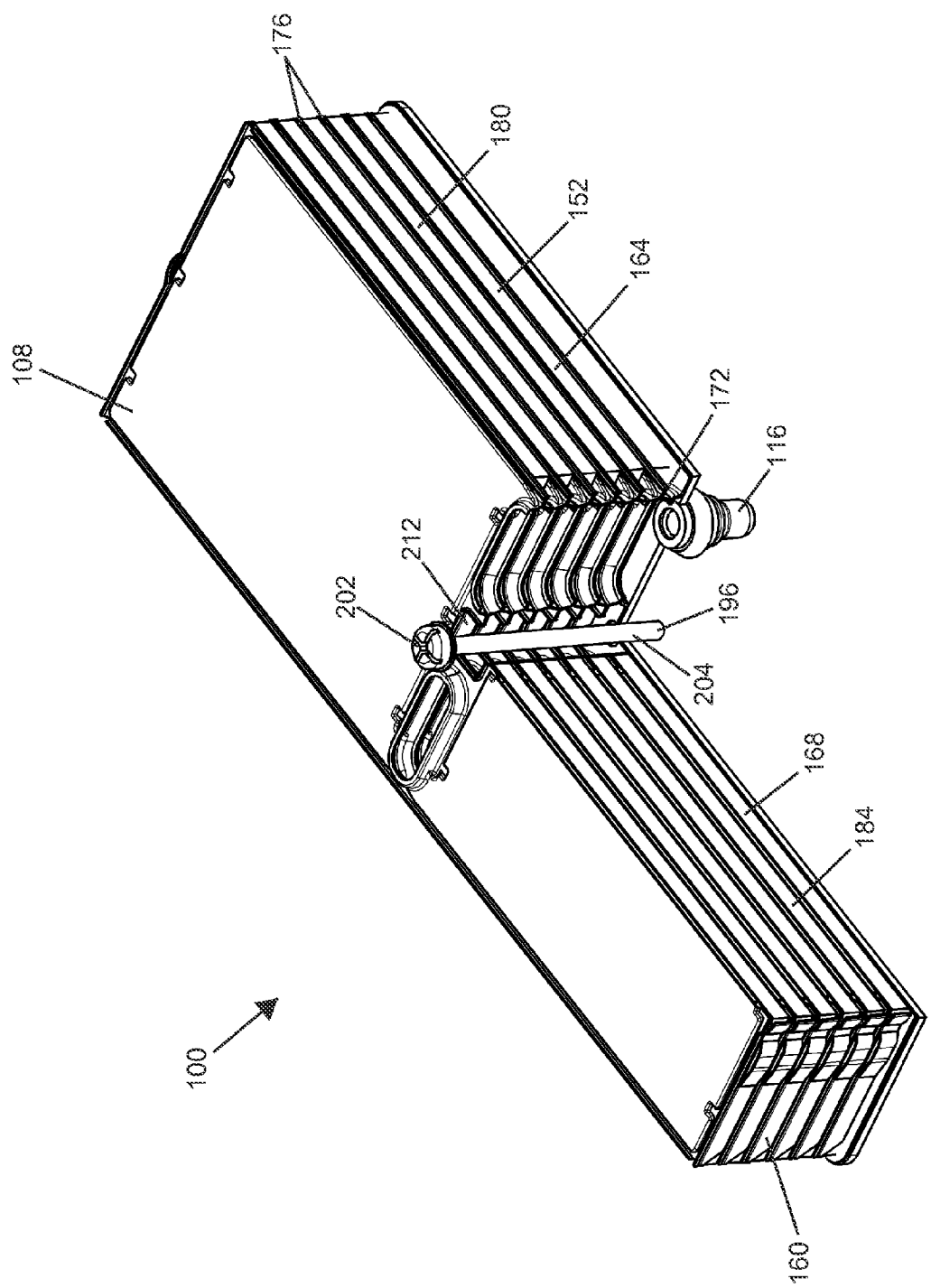
FIG. 13 is another perspective, partial cross-sectional view of the charge air cooler of FIG. 9 with a housing removed.

As shown in FIGS. 12 and 13, the heat exchanger core 108 defines a pocket 212. The illustrated pocket 212 is a continuous channel or passageway extending through the core 108. The fastener 196 extends through the pocket 212. The pocket 212 is defined by the plate pairs 176 and, more particularly, upstanding flanks or sidewalls of the plate pairs 176. The pocket 212 utilizes an unused, central space that is formed between the first coolant circuits and the second coolant circuits of the plate pairs 176 (see FIG. 7). The pocket 212 is, thereby, isolated from the coolant circuits and from the charge air flow channels 180, 184 so that neither coolant nor charge air can enter the pocket 212 and reach the fastener 196.

Centrally locating the fastener 196 on the charge air cooler 100 helps efficiently use the available space of the charge air cooler 100 without interfering with the coolant circuits or the charge air flow channels 180, 184. In addition, the core 108 can be secured within the housing 104 (and the housing portions 120, 124 can be clamped together) by a single member, rather than by multiple fasteners or by more complex welding or brazing techniques. Furthermore, the centrally-located fastener 196 helps keep the housing portions 120, 124 together during high boost pressures that may occur during operation of the charge air cooler 100. In particular, the fastener 196 helps maintain proper clamp loads between the housing portions 120, 124 and between the coolant inlet and outlet 112, 116 and the housing 104. The fastener 196 keeps the clamp loads on the seal of a face seal or keeps radial seals properly loaded. The fastener 196 also simplifies coolant connections at the inlet 112 and the outlet 116 when incorporating coolant passages in the housing 104.

Operation of the charge air cooler 100 is generally the same as the charge air cooler 10 described above.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. A charge air cooler comprising:
   a housing;
   a heat exchanger core positioned within the housing, the heat exchanger core including a first core section, a second core section, and a centrally located section positioned between the first core section and the second core section;
   a plurality of coolant circuits, each of the plurality of coolant circuits extending through at least one of the first and second core sections;
   a coolant inlet extending from the centrally located section, the coolant inlet configured to deliver coolant to the plurality of coolant;
   a coolant outlet extending from the centrally located section, the coolant outlet configured to receive coolant from the plurality of coolant circuits; and
   a fastener extending through the centrally located section of the heat exchanger core to secure the heat exchanger core to the housing.

2. The charge air cooler of claim 1, wherein the fastener is positioned between the coolant inlet and the coolant outlet.

3. The charge air cooler of claim 1, wherein the heat exchanger core defines a pocket, and wherein the fastener extends through the pocket.

4. The charge air cooler of claim 3, wherein the pocket is isolated from the plurality of coolant circuits.

5. The charge air cooler of claim 4, wherein the heat exchanger core comprises a plurality of plates arranged in a stack configuration, and wherein the pocket is defined by the plurality of plates.

6. The charge air cooler of claim 1, further comprising:
   a first plurality of charge air flow channels extending through the first core section in heat transfer relationship with at least some of the plurality of coolant circuits; and
   a second plurality of charge air flow channels extending through the second core section in heat transfer relationship with at least some of the plurality of coolant circuits.

7. The charge air cooler of claim 6, wherein the fastener extends through a pocket defined by the heat exchanger core, and wherein the pocket is isolated from the plurality of coolant circuits, the first plurality of charge air flow channels, and the second plurality of charge air flow channels.

8. The charge air cooler of claim 1, wherein the fastener includes a threaded bolt.

9. A charge air cooler comprising:
   a housing;
   a heat exchanger core positioned within the housing, the heat exchanger core having a first end and a second end;
   a coolant inlet extending from the housing in fluid communication with the heat exchanger core;
   a coolant outlet extending from the housing in fluid communication with the heat exchanger core;
   a plurality of coolant circuits formed in the heat exchanger core and extending between the coolant inlet and the coolant outlet;
   a plurality of charge air flow channels extending from the first end of the heat exchanger core to the second end of the heat exchanger core in heat transfer relationship with the plurality of coolant circuits; and
   a fastener extending through the heat exchanger core to secure the heat exchanger core to the housing, the fastener being located centrally between the first end and the second end of the heat exchanger core.

10. The charge air cooler of claim 9, wherein the fastener is located between the coolant inlet and the coolant outlet.

11. The charge air cooler of claim 10, wherein the coolant inlet is positioned adjacent the first end of the heat exchanger core, and wherein the coolant outlet is positioned adjacent the second end of the heat exchanger core.

12. The charge air cooler of claim 9, wherein the heat exchanger core defines a pocket, and wherein the fastener extends through the pocket.

13. The charge air cooler of claim 12, wherein the pocket is isolated from the plurality of coolant circuits and from the plurality of charge air flow channels.

14. The charge air cooler of claim 13, wherein the heat exchanger core comprises a plurality of plates arranged in a stack configuration, and wherein the pocket is defined by the plurality of plates.

15. The charge air cooler of claim 9, wherein the fastener is evenly spaced between the first end and the second end of the heat exchanger core.

16. The charge air cooler of claim 15, wherein the heat exchanger core includes a first side extending between the first and second ends and a second side extending between the first and second ends, and wherein the fastener is evenly spaced between the first side and the second side of the heat exchanger core.

17. The charge air cooler of claim 9, wherein the fastener includes a threaded bolt.

18. The charge air cooler of claim 9, wherein the first end of the heat exchanger core is configured to be adjacent an air inlet of an engine, and wherein the second end of the heat exchanger core is configured to be adjacent a plurality of runners of the engine.

19. An air intake manifold for an engine, the air intake manifold comprising:
   an air inlet to receive a flow of compressed charge air;
   a plurality of runners to deliver cooled compressed charge air to a corresponding plurality of combustion cylinders of the engine; and
   a charge air cooler arranged within the air intake manifold between the air inlet and the runners, the charge air cooler comprising
      a housing,
      a heat exchanger core positioned within the housing and having a first end adjacent the air inlet and a second end adjacent the plurality of runners, the heat exchanger core including a first core section, a second core section, and a centrally located section positioned between the first core section and the second core section,
      a plurality of coolant circuits, each of the plurality of coolant circuits extending through at least one of the first and second core sections,
      a coolant inlet extending from the centrally located section, the coolant inlet configured to deliver coolant to the plurality of coolant circuits, a coolant outlet extending from the centrally located section, the coolant outlet configured to receive coolant from the plurality of coolant circuits, a first plurality of charge air flow channels extending through the first core section from the first end of the heat exchanger core to the second end of the heat exchanger core in heat transfer relationship with at least some of the plurality of coolant circuits, a second plurality of charge air flow channels extending through the second core section from the first end of the heat exchanger core to the second end of the heat exchanger core in heat transfer relationship with at least some of the plurality of coolant circuits, and a fastener extending through the centrally located section of the heat exchanger core to secure the heat exchanger core to the housing.

20. The charge air cooler of claim 19, wherein the fastener extends through a pocket defined by the heat exchanger core, and wherein the pocket is isolated from the first plurality of coolant circuits, the second plurality of coolant circuits, the first plurality of charge air flow channels, and the second plurality of charge air flow channels.

\* \* \* \* \*

UNITED STATES PATENT AND TRADEMARK OFFICE
CERTIFICATE OF CORRECTION

| | | |
|---|---|---|
| PATENT NO. | : 9,038,610 B2 | Page 1 of 1 |
| APPLICATION NO. | : 14/461955 | |
| DATED | : May 26, 2015 | |
| INVENTOR(S) | : Steven P. Meshenky et al. | |

It is certified that error appears in the above-identified patent and that said Letters Patent is hereby corrected as shown below:

In the Claims:

Claim 1, column 11, line 27, after the phrase "plurality of coolant" add the word ---circuits---

Signed and Sealed this
Second Day of August, 2016

Michelle K. Lee
*Director of the United States Patent and Trademark Office*